March 19, 1929.  F. A. DAVIDSON  1,706,147
COUPLING DEVICE
Original Filed Jan. 26, 1926   2 Sheets-Sheet 1
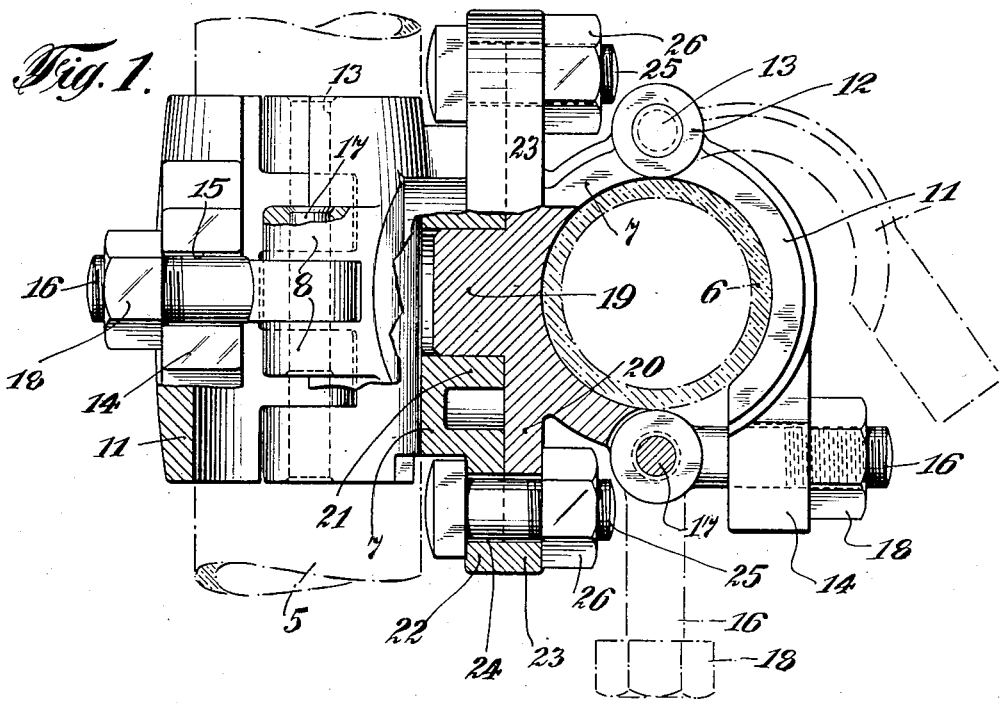
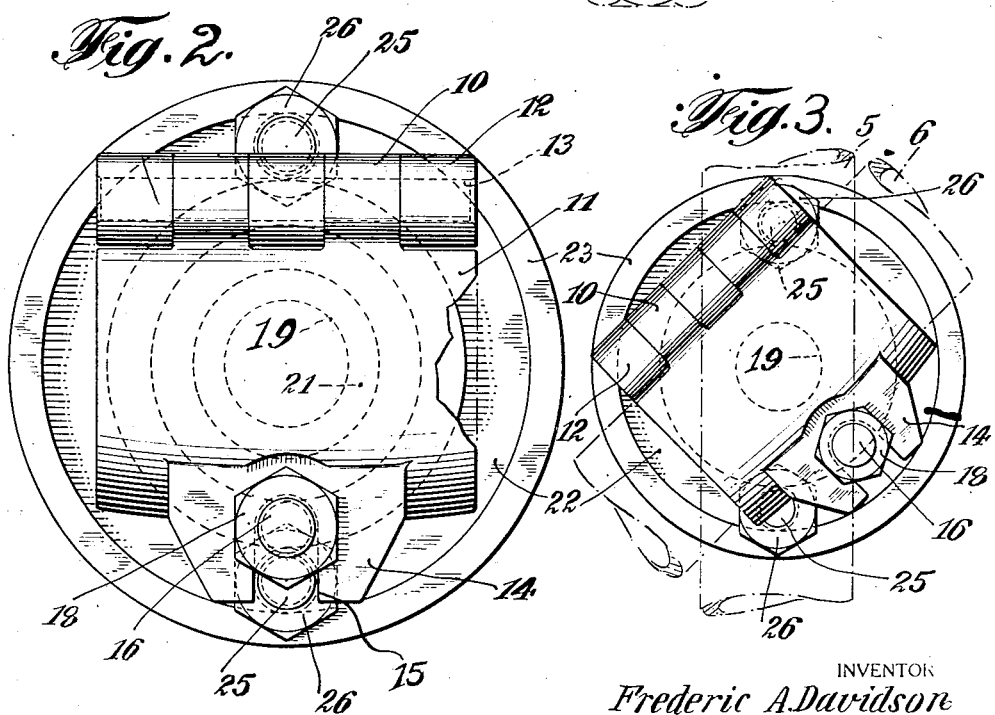
INVENTOR
Frederic A. Davidson
BY C. P. Goepel
his ATTORNEY March 19, 1929.  F. A. DAVIDSON  1,706,147
COUPLING DEVICE
Original Filed Jan. 26, 1926   2 Sheets-Sheet 2
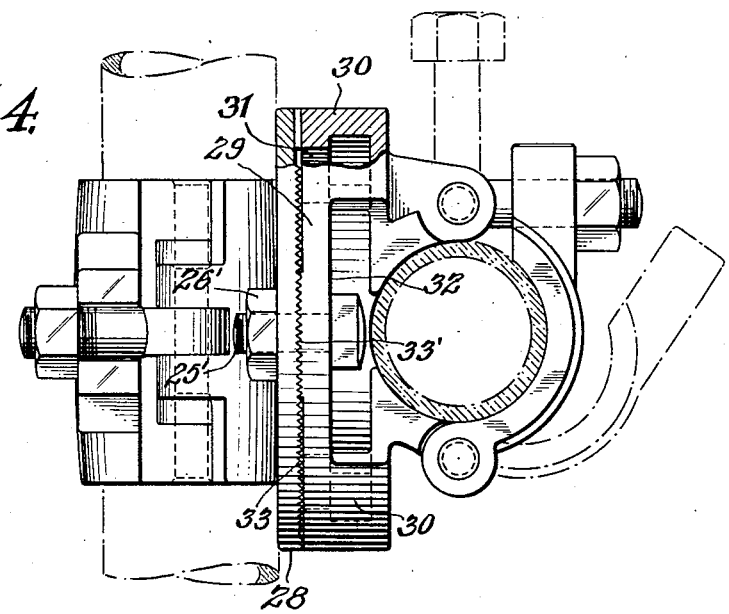
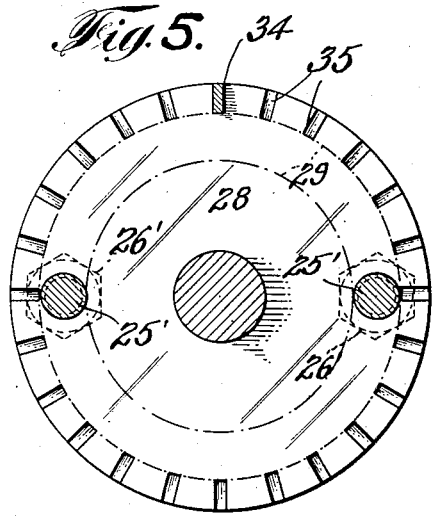
INVENTOR
Frederic A. Davidson
BY
his ATTORNEY Patented Mar. 19, 1929.

1,706,147

UNITED STATES PATENT OFFICE.

FREDERIC A. DAVIDSON, OF CHICAGO, ILLINOIS, ASSIGNOR TO AMERICAN SAFETY DEVICE CO., OF NEW YORK, N. Y., A CORPORATION OF NEW YORK.

COUPLING DEVICE.

Application filed January 26, 1926, Serial No. 83,805. Renewed July 6, 1928.

This invention relates to coupling devices, and more particularly to a device for coupling together elements positioned in intersecting planes, the invention as herein disclosed being particularly designed for application and use in connection with tubular or cylindrical parts of scaffold structures.

It is one of the primary objects of my present improvements to provide a device for the above purpose which is of exceedingly simple construction, and in which the several elements are permanently assembled, there being no separate or loose parts which might easily become lost or mislaid.

It is another object of my invention to provide a coupling device of this character which will be highly efficient and serviceable for the purpose in view and will possess maximum strength and durability.

It is also one of the important purposes of my invention to provide a coupling device which can be very easily and quickly applied to the angularly related elements to be coupled together and in which the number of manual operations for effecting the proper application of the device are reduced to a minimum.

In a preferred embodiment of the invention, it may be briefly referred to as consisting essentially in the provision of two clamps for engagement with the respective elements to be coupled and said clamps having adjacent connected sections to be located between said elements with an adjustable section connected to each of the first named sections together with adjusting means for the latter clamp sections so as to tightly clamp the same upon the respective elements whereby the device is held in rigidly fixed relation thereto. As an additional feature of utility I also propose to provide a universally adjustable connection between the two clamps whereby said clamps can be readily engaged with the respective elements to be coupled, although the planes in which said elements may be positioned may intersect each other at an angle of greater or less than 90°.

With the above and other objects in view, the invention consists in the improved coupling device, and in the form, construction and relative arrangement of its several parts as will be hereinafter more fully described, illustrated in the accompanying drawings and subsequently incorporated in the subjoined claims.

In the drawings, wherein I have disclosed several simple and practical embodiments of the invention, and in which similar reference characters designate corresponding parts throughout the several views,—

Figure 1 is a top view partly in section showing one form of my improved coupling device in operative position.

Fig. 2 is a front elevation;

Fig. 3 is a similar view on a reduced scale showing an adjusted position of the parts;

Fig. 4 is a view similar to Fig. 1 showing a slightly modified construction;

Fig. 5 is a detail view illustrating an alternative of the locking means for the two parts of the coupling shown in Fig. 4.

Referring in detail to the drawings, and for the present more particularly to Figs. 1, 2 and 3 thereof, 5 and 6 respectively, designate two tubular or cylindrical supporting elements for a scaffold or other structure which are to be connected and rigidly held in definitely fixed angular relation to each other by means of the coupling device forming the subject matter of the present application.

As herein shown, this device consists of two clamps engageable with the respective supporting elements, each of said clamps including a substantially semi-cylindrical section 7. The sections 7 are connected together in a manner that is fully described herein later; one of the sections 7 shown at the right in Figure 1 having a stud 19 for the purpose of pivotal engagement with the other section, and each of the sections 7 has a pair of perforated lugs 8 to receive a pivot pin 17 and hold in place an eyelet bolt 16.

Each of the clamps also includes a movable section 11 complementary in form or shape to the sections 7 and provided upon one of its edges with ears or lugs 12 adapted to be assembled with the spaced ears or lugs 10 on the sections 7. These ears 10 and 12 are apertured to receive the pivot pin 13 whereby the section 11 of each clamping element is pivotally connected along one of its edges with the section 7 for swinging movement relative thereto. Upon the opposite longitudinal edge of the pivoted section 11 a laterally projecting lug 14 is formed, said lug being slotted or bifurcated as at 15 for the reception of the bolt 16 having one of its ends positioned between the spaced ears 8 as the case may be, and loosely engaged for swinging movement upon the pivot pin 17 fixed in said ears. Each of the bolts 16 is threaded to receive a suitable clamping nut 18 which is adapted to engage against the outer side of the lug 14 on the section 11 to urge the latter and the opposed section 7 of the clamp into tight clamping engagement upon the opposite sides of one of the supporting elements 5 or 6.

It will be apparent that a coupling device of the above description may be very easily and quickly applied and adjusted so as to rigidly connect or couple the members 5 and 6 positioned in intersecting planes to each other and positively hold the same against relative movement. Thus, it is only necessary, when the two elements 5 and 6 are set in position to engage the sections 7 of the two clamps which are open with the opposed sides of said elements at the point of intersection. The pivoted clamp sections 11 are then swung to closed position against the opposite sides of said elements, the bolts 16 swung inwardly into the slots 15 in the lugs 14 and the nuts 18 finally adjusted by means of a suitable wrench so as to cause the two sections of each clamp to exert the desired tight frictional binding pressure upon the supporting elements. It will be noted that when the device is applied, all of the parts thereof are in assembled relation, and it is not necessary to carry a large number of separate parts to be successively assembled as the device is applied. Therefore, the necessary adjustments may be very easily and quickly made, and the time consumed in the operation of securely and effectively coupling the two supporting elements 5 and 6 with each other is thereby reduced to a minimum.

To make the two clamps each comprising sections 7 and 11 adjustable with respect to each other, one of the clamps has a stud 19 projecting therefrom, and this stud is surrounded by a flange 20, both the stud and the flange being integral with the section 7.

The section 7 of the other clamping member is centrally formed on its outer side with a hollow radially projecting boss 21 to loosely receive the stud 19. This clamp section is also additionally provided in spaced relation to the boss 21 with an outwardly extending flange 22 having formed on the outer edge thereof an annular extension or rib 23, the width of which is substantially equivalent to the thickness of the flange 20 on the section 7 of the other clamp. At diametrically opposite points and inwardly of the extension 23, the flange 22 is provided with bolt receiving openings 24 through which the bolts 25 are engaged. Clamping nuts 26 threaded on these bolts are adapted to be adjusted into binding contact upon the flange 20 of one of the clamp sections 7 and upon the annular rib or extension 23 on the other clamp section, thus holding the two clamps in adjusted relation and preventing casual turning or rotational movement of one of said clamps with respect to the other. In this manner, it will be seen that I provide a universally adjustable connection between the two clamps, which otherwise are of substantially the same construction as previously described. Therefore, in the event that the supporting elements 5 and 6 should be positioned in other than a right angular relation to each other as indicated in Fig. 3 of the drawings, the nuts 26 may be loosened and said clamps relatively rotated and properly adjusted with respect to each other so that they may be easily engaged upon the two supporting elements in the manner above described. The nuts 26 can then be readily tightened against the flange 20 and rib 23 so as to rigidly hold the two clamps in such adjusted relation, and the sections 11 of said clamps then closed and adjusted into clamping engagement with the supporting elements as heretofore explained. In this manner, I provide a coupling device of great flexibility having a wide range of utility in its application to various arrangements of the elements or parts to be coupled together.

In Fig. 4 of the drawings, I have shown a slight modification of the universally adjustable form of the coupling illustrated in Fig. 1 wherein one of the coupling sleeves has a plate 28 integrally formed on one side thereof. A similar plate 29 of the same diameter is spaced from one side of the other coupling sleeve and at diametrically opposite points is integrally connected therewith at its outer edge by the arcuate angular flanges 30. This plate is provided with a continuous circular slot 31, said plate at the inner side of this slot being directly formed upon the body of the coupling sleeve. Bolts 25' are engaged through openings in the plate 28 and extend through the slot 31. The spaces indicated at 32 between the parts 30 afford access to the bolt heads which are engaged upon the inner face of the plate 29 at opposite sides of the slot 31 as indicated in Fig. 5 of the drawings. The nuts 26' are threaded upon the other ends of said bolts.

In order to positively prevent relative turning movement of the two parts of the coupling after they have been adjusted, the face of the plate 28 is provided at its outer edge with a continuous annular series of teeth or serrations 33' while the opposed face of the outer edge portion of the plate 29 is provided at diametrically opposite points with a series of similar teeth or serrations 33 to interlock with the teeth 33' when the nuts 26' are tightened on the bolts 25'. It will be apparent that by reason of this interlocking connection, the bolts 25' are relieved of strains which might occur from the tendency of the two parts of the coupling to rotate under pressure in relatively opposite directions.

In Fig. 5 I have shown a slight modification of this interlocking means for the coupling parts, wherein the plate 29 may be provided at its outer edge with one or more short radially extending key lugs 34 to engage in selected recesses or grooves 35 arranged in suitably spaced relation and in any desired number upon the opposed face of the plate 28. In this case, however, it will be seen that the number of possible adjustments of the two coupling parts will be limited by the number of the key receiving grooves or recesses 35.

From the foregoing description taken in connection with the accompanying drawings, it is believed that the form, construction and several advantages of the described embodiments of the device will be readily understood. In each case, it will be appreciated that the device will have maximum strength and durability while at the same time, it is of comparatively light weight and can be easily handled and quickly applied to securely couple the two elements together. I have referred to certain constructions, which I believe to be thoroughly practical, but it will nevertheless, be understood that the device may be susceptible to embodiment in various other alternative structures, and I accordingly reserve the privilege of resorting to all such legitimate changes in the form, construction and relative arrangement of the various elements as may be fairly incorporated within the spirit and scope of the invention as claimed.

I claim:

1. A coupling comprising a pair of clamping elements, flanges on said elements, means connecting the elements for relative rotation about an axis which mutually intersects those of said elements, and bolts extending through the flanges, and offset with relation to the axis of rotation to bind the flanges and hold the elements in adjusted positions.

2. A coupling comprising a pair of laterally disposed clamping elements, one of said elements being provided with a socket, a boss on the co-operating element for reception in the socket whereby the elements are connected for relative rotation about the axis of said socket, and locking means offset from the common axis to hold the parts together and against relative rotation.

3. A device for coupling together elements positioned in intersecting planes comprising two clamps each consisting of an elongated sleeve and means for adjustably clamping said sleeve upon one of said elements, one of said sleeves having a tubular boss formed on one side thereof and the other sleeve having a radially projecting stud rotatably engaged in said boss whereby the sleeves may be relatively adjusted in the plane of their axes to be engaged upon and secured to the respective elements, said sleeves being further provided with laterally projecting annular flanges engaged upon each other, bolts mounted in the flange of one sleeve, and clamping nuts threaded upon said bolts adapted to engage the flange on the other sleeve and releasably secure said sleeves in such adjusted relation against rotational movement with respect to each other.

4. A coupling comprising a pair of clamping elements, having their axes laterally spaced and angularly disposed with reference to each other, means connecting the elements for relative rotation about a mutually intersecting axis, and means offset from the axis of rotation to hold the elements in adjusted position.

5. A coupling comprising a pair of clamping elements, flanges on said elements, means connecting the elements for relative rotation about an axis which mutually intersects those of said elements and bolts extending through the flanges, and offset with relation to the axis of rotation to bind the flanges and hold the elements in adjusted positions.

In testimony that I claim the foregoing as my invention, I have signed my name hereto.

FREDERIC A. DAVIDSON.